Aug. 17, 1965
N. LOCKE
3,201,121
BICYCLE EXERCISER ACCESSORY
Filed May 17, 1963
2 Sheets-Sheet 2
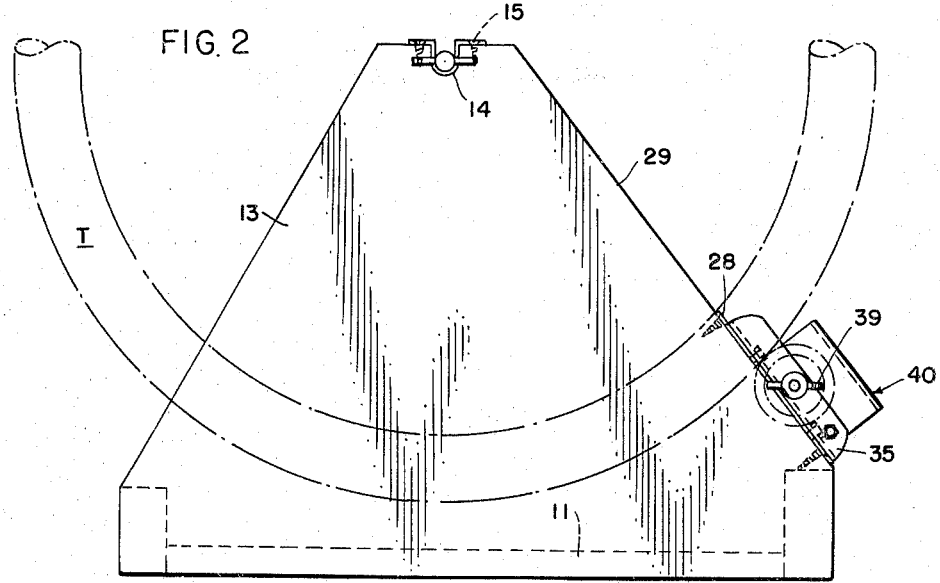
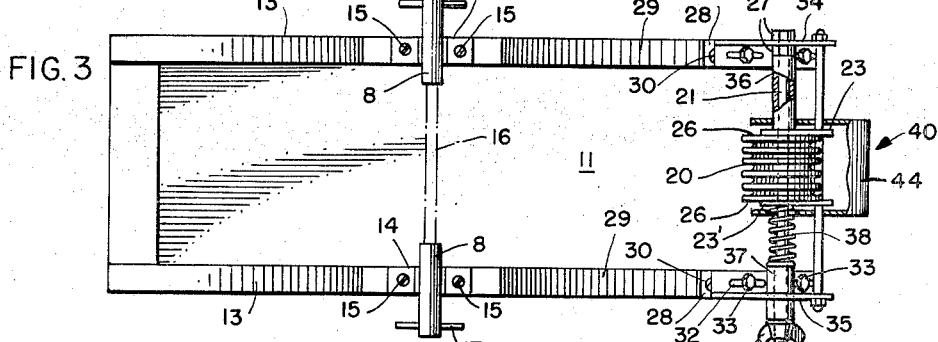
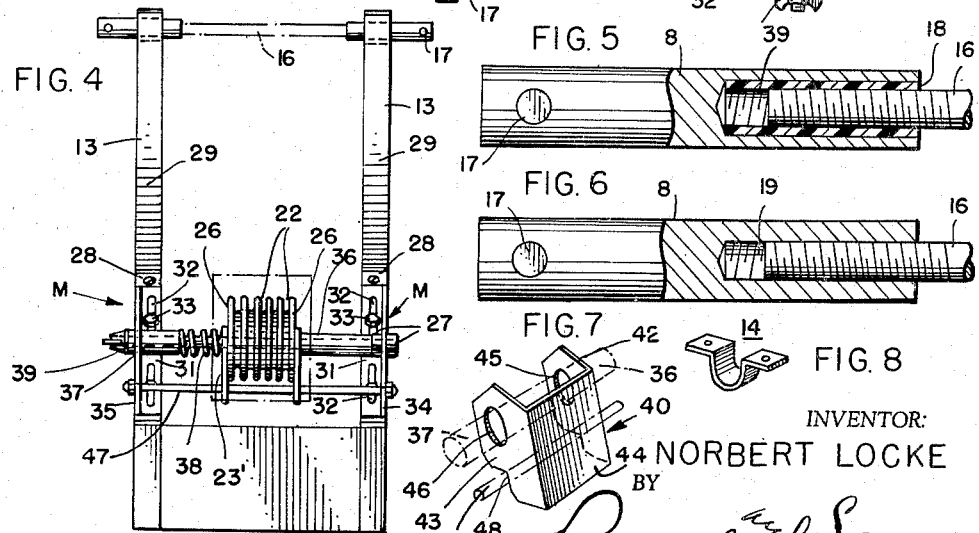
INVENTOR:
NORBERT LOCKE
BY
ATT'YS

United States Patent Office 3,201,121
Patented Aug. 17, 1965

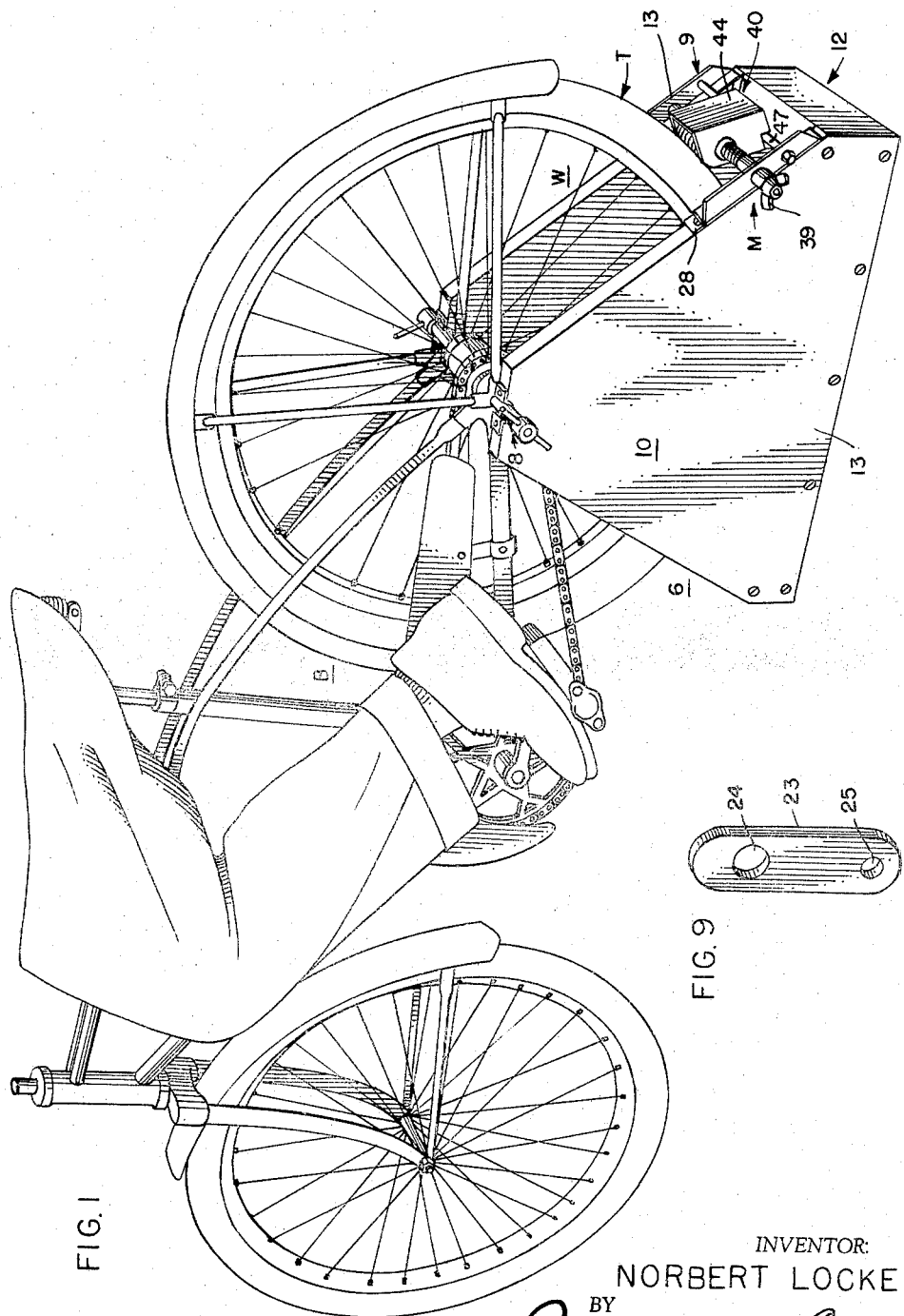

3,201,121
BICYCLE EXERCISER ACCESSORY
Norbert Locke, 914 James Court, Wheaton, Ill.
Filed May 17, 1963, Ser. No. 281,154
3 Claims. (Cl. 272—73)

This invention relates to improvements in an accessory for the temporary conversion of a standard bicycle into a physical-exerciser.

Heretofore many types of accessory have been developed for use in converting a standard bicycle into an instrument for physical exercising. As a rule these prior developments have been quite complicated and required a considerable expenditure of time and effort to mount and dismount the bicycle.

The main objects of this invention are: to provide an improved form of exerciser-accessory for use with any bicycle; to provide an improved exerciser-accessory of this kind of the very simplest construction with such a minimum of parts as to make for a very quick mounting and dismounting of the bicycle thereon; to provide an improved form and arrangement of an adjustable drag roller for regulating the resistance to the rotation of the rear wheel of the bicycle; and to provide an improved exerciser-accessory of this kind of such simple construction as to make its manufacture very economical and its use extremely facile and gratifying.

One specific embodiment of my invention is shown in the accompanying drawings, in which:

FIGURE 1 is a perspective view of an exerciser-accessory, constructed in accordance with this invention, in use position with a standard bicycle;

FIG. 2 is a side elevation of the exerciser-accessory per se, with the bicycle tire shown in phantom;

FIG. 3 is a plan view of the device of FIG. 2;

FIG. 4 is a rear view of the same;

FIG. 5 is an enlarged, side elevation, partly in section, of the extension attachment of the rear-wheel axle of the bicycle which seats in the exerciser-accessory;

FIG. 6 is a modified form of the device of FIG. 5; and

FIGS. 7, 8 and 9 are perspective views of details of parts of the invention.

The essential concept of this invention involves a support with upwardly-extending, frusto-pyramidical standards for mounting the rear-wheel axle of a bicycle therein to dispose the tire in contact with an adjustable braking or drag device.

A bicycle-accessory, for use with a conventional bicycle B, embodying the foregoing concept, comprises a support 6 comprising, adapters 8 for the rear axle of the bicycle to extend the axle axially laterally for seating on upper end of the support and whereby the rear wheel W of the bicycle is positioned in the support, with the rear tire T in contact with an adjustable braking or drag device 9. The bicycle B here shown is of the male type; however, the accessory could be used with equal facility with the female type bicycle.

The support 6 here is shown as structured to provide a rectangular-shaped base element 10 having a horizontal extending bottom wall 11 and a pair of vertically extending end walls 12, vertically extending truncated-pyramidically-shaped side walls 13, spaced apart horizontally to afford sufficient room for mounting of the axle supports 8 and the braking device 9, are anchored at their lower ends to the base element 10 as shown in the drawings. The side walls, at their upper ends, are each provided with a depending groove for the reception of a U-shaped bearing 14. The bearing is suitably anchored therein such as by screws 15.

The pair of extensions or stud-shafts 8 are each of a diameter smaller than bearing 14 for loosely seating therein. The purpose of the shafts 8 are to extend the length of the rear axle 16, a short distance laterally of the side walls 13. The inner ends of the stud-shafts 8 are bored and threaded to retentively seat the respective ends of the rear axle 16. The outer ends of these stud-shafts have transverse pins 17 for use in the turning of the stud-shafts 8 as may be necessary to completely telescope the ends of the axle 16 therein. Alternative formations of the bores of the stud-shafts may be employed. This may be either a friction fitted sleeve 18 (FIG. 5) of self-threading material, for instance neoprene, or conventional threads 19 (FIG. 6). The latter when used, may be either right- or left-handed threads, depending upon the make of the bicycle wherewith this accessory is to be used.

The braking or drag device 9, comprises a drag roller 20 positioned and freely rotatable on a shaft 21, and medially of its ends. The roller 20 has a series of circumferential grooves 22 formed in its outer surface, the purpose of which will hereinafter be more fully described. The roller 20 is preferably formed of pressed fiber impregnated with graphite.

A pair of substantially rectangular steel plates 23 and 23' (FIG. 9) are each provided with apertures 24 and 25 and are positioned one on each side of the end walls 26 of the roller 20, with the shaft 21 extending through the apertures 24, forming a loose fit. The shaft 21 is threaded at both ends and anchored at one end to a mounting M by a pair of nuts 27.

The mounting M comprises a pair of plates 28 each secured respectively adjacent and to the rear lower edge face 29 of the side walls 13 by suitable fastenings 30. The horizontally disposed legs 31 of a pair of right angle irons are each respectively provided with pairs of elongated slots 32 through which headed machine screws 33 are inserted for bolting down the angle irons to the plates 28 as shown in FIG. 2. Thus the angle irons may be adjusted longitudinally and relative to the plate 28.

The vertically disposed legs 34 and 35 of the angle iron are each provided with opposed apertures through which the shaft 21 projects. As clearly shown in FIGS. 3 and 4 the nuts 27 are positioned on the shaft 21 one on each side of the leg 34 and tightened so as to prevent rotation of the shaft. Sleeves 36 and 37 are threaded on the shaft 21 to space the roller 20 medially from the ends of the shaft and the side walls 13 of the support 6. The sleeve 36 bears at one end on the face of the inner nut 27 and the plate 23 on the right hand side of the roller 20 as viewed in FIG. 3.

As shown most clearly in FIG. 4 a compression spring 38 is loosely positioned on the shaft 21 and bears at one end against plate 23' and the inner end of sleeve 37, the shaft aperture in the leg 35 is large enough to readily provide lateral movement of the sleeve 37 therethrough. A wing nut 39 with a base portion larger than the aperture in the member 35, and the diameter of the sleeve 37, is secured to the shaft 21, as seen in FIGS. 3 and 4. This shaft extends outwardly beyond the member 35.

It now should be obvious that by clockwise turning of the nut 39 on the shaft the sleeve 37 moves to the right as seen in FIG. 4 to compress the spring 38 so that the spring will exert pressure against the plate 23' and it in turn to the side wall 26 of the drag roller 20. Thus as the plate 23 is stationary the amount of braking of the roller is adjustable by varying the pressure exerted by the spring 38.

When the rear wheel W is positioned in the device the tire T will bear aganist the roller and the bicycle will be held in upright position as the extension members 8 will be seated in the bearings 14. When a person rides the bicycle a part of his weight will be transferred to the rear wheel axle 16 to retain the bicycle in the device.

As the rear wheel engages the roller 20, the roller will retard the rotation of the wheel W. By adjusting the tension on the spring 38 by the nut 39 it will vary the effort necessary to pedal the bicycle.

Even though the grooves 22 in the drag roller 20 will tend to dissipate the heat generated by the tire face bearing thereagainst the roller, rapid pedaling of the rear wheel will generate some heat in the plates 23 and 23' because they frictionally engage the side walls of the roller 20.

To protect against accidental burns by one inadvertently touching the mounting elements M, etc. I have provided a guard 40 (see FIG. 7) to surround that part of the roller and plates 23 and 23' that project rearwardly of the device of this invention. The guard 40 has a pair of side walls 42 and 43 and a rear wall 44. The side wall 42 is provided with an aperture 45 of a size to loosely seat on sleeve 36 while the aperture 46 is larger to loosely seat on the spring 38 as clearly seen in FIG. 3.

A rod 47 is positioned on the mounting M and anchored to the members 34 and 35, as seen in the drawings, after the plates 23 and 23' have been positioned thereon employing the apertures 25 so to do. Also to prevent rotation of the guard 40 the side walls are offset as at 48 for seating on rod 47.

If the extensions 8 on the axle 16 of the wheel W upon placement of the rear tire on the drag roller 20 appears not to be seated in the bearing 14 or substantially within the bearing slot then the mounting M would be lowered by loosening machine screws 33 to lower the angle irons to the position desired and then tightened again. It should be now obvious that the bearing 14 is not essential to operation of the device since normally the extensions 8 would not fully seat in the bearing as the purpose of the bearing slots are to support the bicycle in upright position.

It should also now be obvious that by loosening screws 33 that the leg 31 is shiftable upwardly and downwardly on plate 28 whereby bicycle wheels anywhere in the range of 20 to 26 inches in diameter may be accommodated on the device of my invention.

It is to be understood that details of the construction shown and described may be altered or omitted without departing from the spirit of this invention as defined by the following claims.

I claim:
1. A bicycle exerciser-accessory comprising,

(a) a support having a pair of horizontally-spaced upright standards of frusto-pyramidical form,
(b) a pair of stud shafts having bores extending inwardly from one end and dimensioned to seat the exposed ends of the rear axle of a bicycle,
(c) a pair of slots upwardly-open and axially aligned, fixed on the upper edges of the standards,
(d) a pair of angle bars adjustably anchored to the upper rear edges of the standards below said slots, and adjacently above the support base and inwardly from the rear ends of the support,
(e) a stationary supporting shaft extending oppositely outward and supported on the respective angle bars,
(f) a drag roller rotatably positioned on said shaft,
(g) plates on each side of said roller having a portion frictionally bearing against the sides of said roller,
  (1) means to prevent rotation of said plates,
(h) a pair of sleeves, one sleeve on each side of said plates respectively and positioned loosely on said shaft,
(i) said angle bars shiftable on the support for varying the position of the drag roller with respect to the bicycle tire, and
(j) means on one end of the shaft for varying the frictional contact between the plate and the roller.

2. The device according to claim 1 wherein the last named means comprises a compression spring on said shaft between said one plate and one sleeve, whereby the inner end of said spring bears against said one plate and the inner end of said one sleeve bears against the outer end of said spring, and a nut on said shaft laterally shifting said sleeve and spring for varying the drag on said roller.

3. The device according to claim 2 wherein the face of said roller is provided wtih a series of grooves, and a protective shield on said shaft for said roller and plates.

References Cited by the Examiner

UNITED STATES PATENTS 2,043,977 6/36 Back _____ 272—73
3,107,915 10/63 Looney _____ 272—73

RICHARD C. PINKHAM, *Primary Examiner.*